Sept. 16, 1947.  C. A. ROBERTSON  2,427,535
STUD CHAIN MACHINE
Filed March 10, 1943  3 Sheets-Sheet 1

INVENTOR.
CHARLES A. ROBERTSON.
BY
Boykin, Mohler & Beckley.
ATTORNEYS

Sept. 16, 1947.  C. A. ROBERTSON  2,427,535
STUD CHAIN MACHINE
Filed March 10, 1943  3 Sheets-Sheet 2

INVENTOR.
CHARLES A. ROBERTSON
BY
ATTORNEYS

Sept. 16, 1947.  C. A. ROBERTSON  2,427,535
STUD CHAIN MACHINE
Filed March 10, 1943  3 Sheets-Sheet 3

INVENTOR.
CHARLES A. ROBERTSON
BY
Boykin, Mohler & Beckley
ATTORNEYS

Patented Sept. 16, 1947

2,427,535

UNITED STATES PATENT OFFICE 2,427,535

STUD CHAIN MACHINE

Charles A. Robertson, San Francisco, Calif., assignor to Round California Chain Corp., Ltd., South San Francisco, Calif.

Application March 10, 1943, Serial No. 478,684

4 Claims. (Cl. 59—27)

1

This invention relates to a machine for forming chain links and has for one of its objects the provision of a machine for more expeditiously forming the links of a chain during the steps of making a length of chain from such links.

Another object of the invention is the provision of a machine that is adapted to form chain links more efficiently and faster than heretofore and which machine is easily operated by relatively unskilled labor and is simple and durable.

A still further object of the invention is improved control means in such machine that enables faster and more economical operation of the machine than heretofore.

An additional object is an improved method of making a chain.

Other objects and advantages will appear in the drawings and description annexed hereto.

Figure 1:
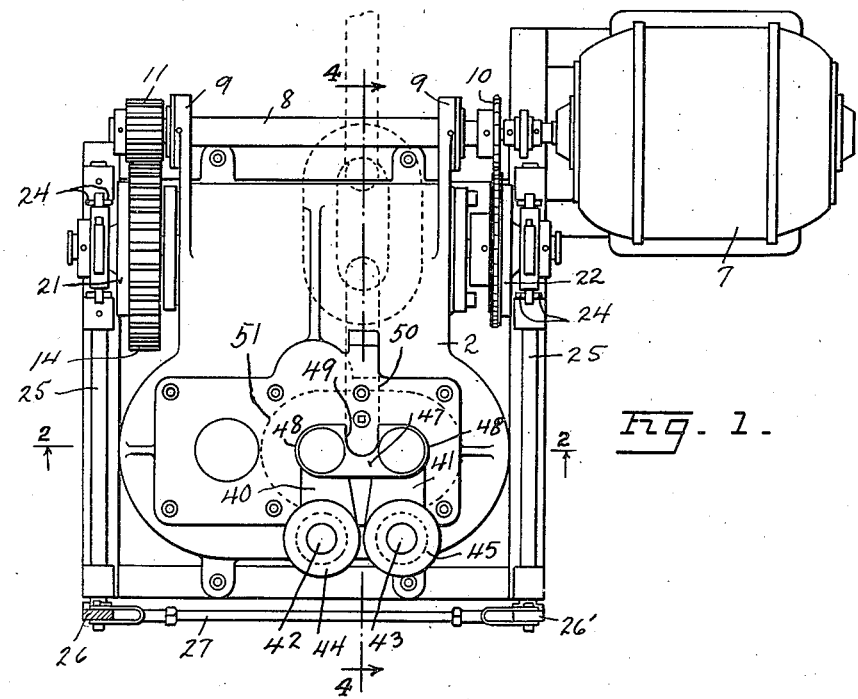
Fig. 1 is a plan view of the machine of this invention.

In detail the machine illustrated in the drawings comprises a main frame having sides 1, a top 2, a generally horizontal partition 3, and a bottom 4, and which frame is preferably of metal cast in several sections of cast metal and may be supported on any suitable base, such as base 5. This base may also carry an extension 6 for the motor 7.

Figures 3, 4:
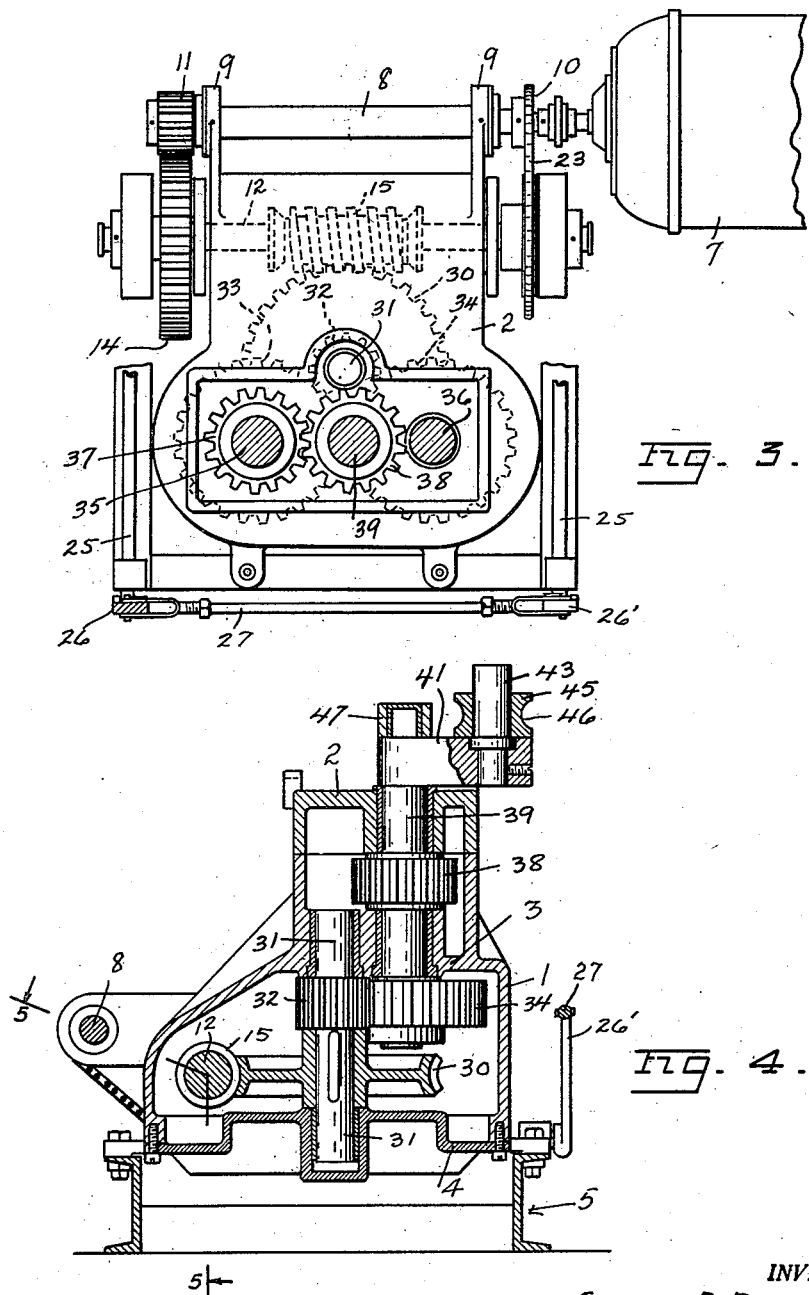
Fig. 3 is a sectional view taken along line 3—3 of Fig. 2.
Fig. 4 is a sectional view taken along line 4—4 of Fig. 1.

Referring to Fig. 3, the motor shaft 8 is supported on bearings carried in extensions 9 projecting from a side of the frame, and which shaft carries a sprocket 10 at one end and a pinion 11 at the other end, said sprocket and pinion respectively being keyed to the shaft 8.

Figure 5:
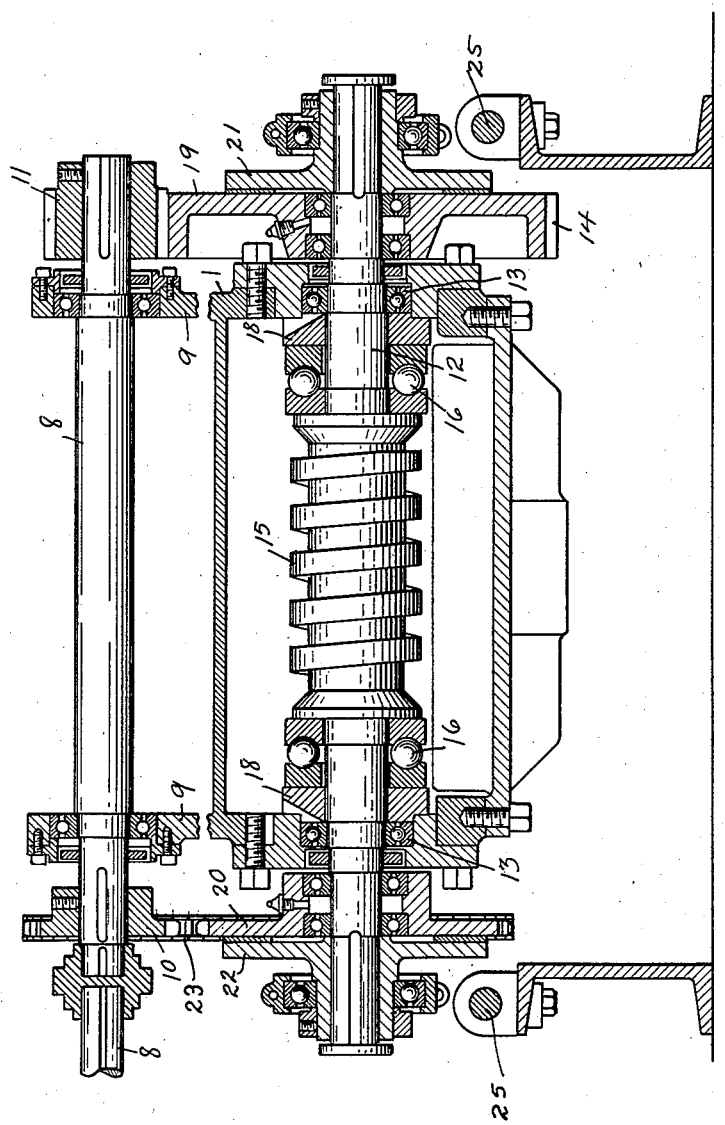
Fig. 5 is an enlarged sectional view taken along line 5—5 of Fig. 4.

A second horizontal shaft 12, parallel with shaft 8 is rotatable in bearings 13 (Fig. 5) carried by two opposed sides of the frame. The central portion of said shaft intermediate bearings 13 is formed with a worm 15, and thrust bearings 16 at opposite ends of the worm between the latter and the bearings 13 respectively take any end thrust of said shaft, said bearings being held against opposite outward movement by any suitable means such as members 18 that are held rigid relative to the frame sides.

The opposite outer end portions of the shaft 12

2 project outwardly of the frame sides. One projecting end portion of shaft 12 rotatably carries one plate 19 of a friction clutch and another plate 20 is rotatably carried on the opposite end portion of shaft 12. Each of the plates 19, 20 is spaced from the outermost end of the projecting portions of shaft 12, and on one of said outermost portions is a plate 21 carrying a friction disk disposed between plate 21 and plate 19 while on the other outermost end portion is a plate 22 carrying a friction disk between said plate and plate 20. These outermost portions of shaft 12 are grooved for a spline carried by the plates 21, 22 respectively for movement of said plates longitudinally of said shaft.

The plate 20 is formed with sprocket teeth and a sprocket drive chain 23 connects the plate and sprocket 10 as indicated in Fig. 3, while plate 19 is formed with gear teeth 14 in mesh with the teeth of pinion 11.

A thrust collar is rotatably supported on a hub formed on each plate 21, 22 which collar carries pins disposed between forks 24 (Figs. 1, 2) that are respectively carried by rotatable parallel shafts 25 at opposite sides of the frame 1. On the ends of shafts 25 are vertically extending arms 26, 26' (Figs. 3, 4) to which are pivotally connected the opposite ends of a bar 27 (Figs. 1 and 3) so that upon manually swinging arm 26, which is extended upwardly to form an operating handle, in one direction, the clutch plates 21, 19 will be engaged, while upon swinging the handle in the opposite direction, the plates 21, 19 will be disengaged and after moving through a neutral position of both clutches the plates 20, 22 will be engaged. Thus, the shaft 12 may be reversed by merely an oscillatory swinging of the handle 26 in one direction or the other, and any unusual and detrimental resistance to driving of shaft 12 in either one direction or the other will merely result in a slippage of one of the two clutches.

This simple structure for effecting reversal of the direction of rotation of the shaft 12 materially speeds up the operation of the machine and also constitutes a safety feature.

Referring again to Fig. 3, the worm 15 is in mesh with a worm gear 30 that is secured on a vertical driven shaft 31. Shaft 31 is journalled in bearings in bottom 4 and partition 3 and said shaft carries a pinion 32 in mesh with the gears 33, 34 which latter gears are respectively secured to vertical shafts 35, 36.

The shafts 35, 36 are each journalled in bearings in partition 3 and top 2, and shaft 35 carries a gear 37 above partition 3 in mesh with a gear 38 that is secured on a vertical countershaft 39, said latter shaft also being journalled in bearings in partition 3 and top 2.

Figure 2:
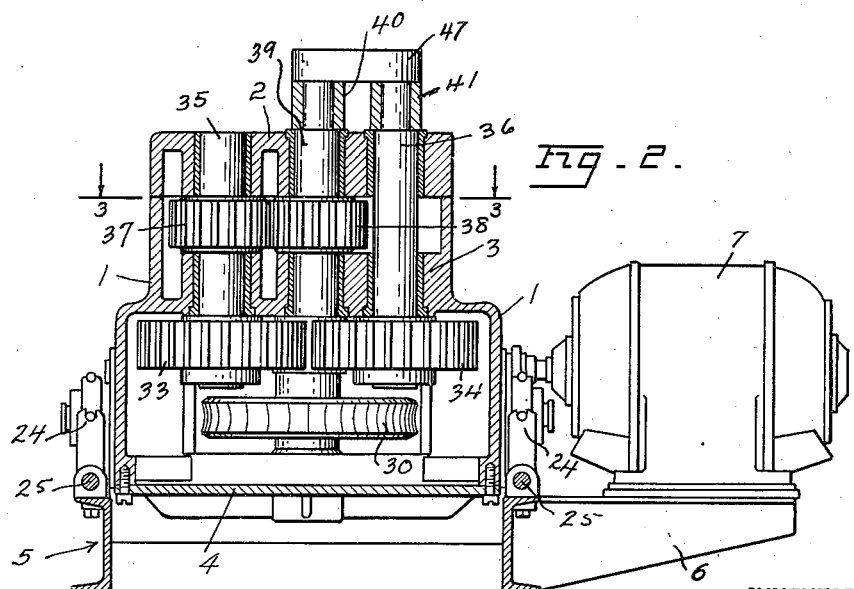
Fig. 2 is a sectional view through the machine of Fig. 1 along line 2—2 of Fig. 1.

Shafts 36, 39 project upwardly above top 1 and on the projecting ends of said shafts are secured a pair of arms 40, 41 projecting laterally from said ends (Fig. 1).

On the outer ends of arms 40, 41 are upwardly projecting stub shafts 42, 43 and rollers 44, 45 are rotatably carried by said stub shafts.

Rollers 44, 45 are disposed in the same plane and their peripheries are grooved arcuately in cross section as at 46 (Fig. 4), the contours of said grooves being generally that of the cylindrical contour of the respective rods from which the links of chain are to be formed.

Secured over the upwardly projecting ends of shafts 36, 39 is a horizontally elongated block or form member 47, which block is of generally oblong-ovate contour in the plane in which rollers 44 are disposed, to conform to the inner contour of the links to be formed. The foci or centers of the curved ends of the form member 47 are in line with the longitudinal axes of the shafts 36, 39. The ends of block 47 are rounded as at 48 (Fig. 1), and the side adjacent rollers 44, 45, when the latter are held at the side thereof remote from the side of the block nearest shaft 8, is straight. The opposite side of the block 47 is formed with a laterally, outwardly opening recess 49 that is slightly wider than the thickness of the rod material from which the chain links are to be formed. The sides of block 47 are flat in width so as to permit the ready sliding of links therefrom as will be later described.

The bars or rods from which the links of the chain are formed are cut to the proper length and are heated to the necessary degree for bending. Rollers 44, 45 are positioned as in Fig. 1 at the start of a link forming operation, and the heated rod is then positioned by an operator between the rollers and block 47 with its ends projecting equal distances past the ends of the block 47. The motor 7 may be running during this time with the clutches at the ends of shaft 12 in neutral positions. The operator then engages clutch plates 19, 21 causing arms 40, 41 to simultaneously move rollers 44, 45 around the curved ends of block 47, thus bending the ends of the heated bar around the block. The last previously formed link of the chain, indicated at 50 (Fig. 1) in dotted line, is positioned by the operator in recess 49 with its central opening directed laterally and as the rollers 44, 45 continue their travel, the ends of the bar that is being bent thereby will move into the central opening of link 50 until the ends of said bar are in substantially abutting relation inside link 50, the link around block 47 being indicated in dotted line at 51 in Fig. 1.

Rollers 44, 45 are sufficently thin to move into the opening in link 50 to cause the complete formation of link 51, and as soon as the link 51 is fully formed, the operator actuates handle 26 to disengage clutch plates 19, 21 and to engage clutch plates 20, 21, thereby immediately causing the arms 40, 41 to swing back to the positions indicated in Fig. 1, at which time another heated bar is positioned between rollers 44, 45 and forming block 47.

The simultaneous movement of arm 40, 41 in bending the heated bar to form each link is very necessary, since the bar cools rapidly with a corresponding increase in its resistance to bending. Also, once the bar is positioned for bending to link form the operation of bending it into interlocking relationship with the previously formed link is accomplished without further shifting of the bar.

It is pertinent to note that the link forming operation does not necessarily require exact positioning of the bar that is being bent in order to form a satisfactory link therefrom, since the rollers 44, 45 will bend the opposite ends of the bar to abutting relation if the bar is approximately in an initial position with its central point about opposite the recess 49 in block 47.

In the event the operator should not effect a reversal of the movement of the arms and rollers at the end of each link forming operation, one or the other of the clutches will merely slip, hence no injury will be done.

The rapidity of reversing the swing of arms 40, 41 is quite desirable since no time is lost in reversing a motor, or in shifting gears, and practically a direct but safe, driving connection is maintained between the motor drive shaft and the main worm drive, with the various gear ratios being such as to enable the use of a relatively low horse power motor without employment of a complicated expensive structure.

The drawings are intended to be illustrative of the invention and are not necessarily restrictive thereof.

The method itself may, of course, be manually performed by an operator, but the machine of this invention accomplishes the steps in a fast operation with practically no effort on the part of the operator.

Having described my invention, I claim:

1. A machine for making chain links comprising, a stationarily supported form member having lateral sides following the contour of the inner side of the link to be formed, a pair of link bending elements spaced from said member at one of the said lateral sides thereof for positioning a straight rod between said elements and said member, arms carrying said elements at one of the ends of said arms and a pair of spaced, parallel, revolvable shafts to which the opposite ends of said arms are secured, the axes of said shafts extending at right angles to the plane in which the said sides of said member are disposed and means supporting said shafts within the confines of said sides of said member for carrying said elements in opposite directions around said sides in paths equally spaced from said sides when said shafts are rotated oppositely on their respective axes, a prime mover operatively connected to said shafts for simultaneously so moving the latter, whereby upon such movement the said elements will bend the opposite end portions of such rod around said member for forming the rod into a centrally open link.

2. A machine for making chain links comprising, a stationarily supported form member having lateral sides following the contour of the inner side of the link to be formed, a pair of link bending elements spaced from said member at one of the said lateral sides thereof for positioning a straight rod between said elements and said member, arms carrying said elements at one of the ends of said arms and a pair of spaced, parallel, revolvable shafts to which the opposite ends of said arms are secured, the axes of said shafts extending at right angles to the plane in which the said sides of said member are disposed and means supporting said shafts within the confines of said sides of said member for carrying said elements in opposite directions around said sides in paths equally spaced from said sides when said shafts are rotated oppositely on their respective axes, a prime mover operatively connected to said shafts for simultaneously so moving the latter, whereby upon such movement the said elements will bend the opposite end portions of such rod around said member for forming the rod into a centrally open link, said elements comprising a pair of rollers respectively supported on said arms, and the said member being formed with an outwardly opening recess in its side that is normally opposite the side adjacent the said pair of rollers when the latter are in position for commencing a bending operation of a rod.

3. A machine for making chain links comprising, a stationarily supported form member having lateral sides following the contour of the inner side of the link to be formed, a pair of link bending elements spaced from said member at one of the said lateral sides thereof for positioning a straight rod between said elements and said member, arms carrying said elements at one of the ends of said arms and a pair of spaced, parallel, revolvable shafts to which the opposite ends of said arms are secured, the axes of said shafts extending at right angles to the plane in which the said sides of said member are disposed and means supporting said shafts within the confines of said sides of said member for carrying said elements in opposite directions around said sides in paths equally spaced from said sides when said shafts are rotated oppositely on their respective axes, a prime mover operatively connected to said shafts for simultaneously so moving the latter, whereby upon such movement the said elements will bend the opposite end portions of such rod around said member for forming the rod into a centrally open link, and means for simultaneously reversing the rotation of said shafts for returning said arms and the elements on the latter to their normal starting position at one side of said member after a predetermined degree of movement thereof oppositely around the sides of said member.

4. In a machine of the character described, a frame, a form member on said frame having a peripheral contour of generally elliptical shape for bending a rod therearound to produce a generally oblong-ovate, centrally open link, a pair of rod bending elements at one side of said form member; a pair of rotatable shafts supported on said frame with their respective axes positioned substantially coaxial with the foci of the curved ends contour of said worm member; arms projecting laterally from said shafts and secured thereto carrying said elements thereon for movement of the latter around the said curved ends of said form member from said one side thereof to the opposite side upon rotation of said shafts oppositely for bending a rod to form such link when a rod is positioned between said elements and the said form; means for so rotating said shafts including a countershaft and a driven shaft, a first pair of intermeshing gears secured on said countershaft and one of said pair of shafts respectively, a second pair of disconnected gears secured on said countershaft and the other of said pair of shafts respectively, a gear secured on said driven shaft intermeshing with both of said pair of disconnected gears; and power means for driving said driven shaft; said first mentioned pair of shafts being relatively close together so that the elements carried thereon will move in oscillatory paths to substantial engagement with each other at opposite sides of said form member upon rotation of said shafts oppositely by reason of rotation of said driven shaft in opposite directions.

CHARLES A. ROBERTSON.

REFERENCES CITED

The following references are of record in the file of this patent:

UNITED STATES PATENTS

| Number | Name | Date |
|---|---|---|
| 871,784 | Coes | Nov. 26, 1907 |
| 1,971,955 | Hoelscher | Aug. 28, 1934 |
| 2,052,651 | Pearmain | Sept. 1, 1936 |
| 83,523 | Miller | Oct. 27, 1868 |
| 1,968,010 | Bailey | July 31, 1934 |
| 2,299,486 | Miller | Oct. 20, 1942 |
| 1,949,015 | Hallenbeck | Feb. 27, 1934 |
| 2,314,549 | Milbrath | Mar. 23, 1943 |
| 2,223,863 | Wunsch | Dec. 3, 1940 |

FOREIGN PATENTS

| Number | Country | Date |
|---|---|---|
| 118,908 | Great Britain | Sept. 19, 1918 |
| 315,232 | Germany | Oct. 31, 1919 |
| 144,885 | Great Britain | June 28, 1919 |